United States Patent [19]
Yu et al.

[11] Patent Number: 5,363,933
[45] Date of Patent: Nov. 15, 1994

[54] AUTOMATED CARRIER

[75] Inventors: Foung-Hsoung Yu; Chien-Hsing Lin; E-Chang Hsu; Huann-Jen Yaung, all of Chutung, Taiwan, Prov. of China

[73] Assignee: Industrial Technology Research Institute, Hsinchu Hsien, Taiwan, Prov. of China

[21] Appl. No.: 932,589

[22] Filed: Aug. 20, 1992

[51] Int. Cl.⁵ ............................................. B62D 11/04
[52] U.S. Cl. .................................. 180/6.5; 180/65.1; 180/169
[58] Field of Search .................. 180/6.2, 6.24, 6.32, 180/6.48, 6.5, 65.1, 65.8, 167, 907, 169; 364/424.02

[56] References Cited

U.S. PATENT DOCUMENTS

| | | | |
|---|---|---|---|
| 4,951,766 | 8/1990 | Basedow et al. | 180/907 |
| 4,953,645 | 9/1990 | Körber et al. | 180/907 |
| 5,022,476 | 6/1991 | Weege | 180/6.5 |
| 5,033,000 | 7/1991 | Littlejohn et al. | 180/907 |
| 5,036,938 | 8/1991 | Blount et al. | 180/65.1 |

FOREIGN PATENT DOCUMENTS

| | | | |
|---|---|---|---|
| 3304708 | 8/1984 | Germany | 180/907 |
| 0382097 | 2/1990 | Germany | 180/907 |

*Primary Examiner*—Richard M. Camby
*Attorney, Agent, or Firm*—Oblon, Spivak, McClelland, Maier & Neustadt

[57] ABSTRACT

A protecting, diversified and/or better operable automated carrier is provided. The carrier includes a carrying body mounting thereon a driving device electrically connected to a controller electrically connected to a commanding device for controlling the moving speed and direction of the carrying body, a CPU electrically connected between the controller and the commanding device, and a protecting device electrically connected to the CPU and capable of resulting in a desired response when the carrying body is within a predetermined distance from an obstacle.

13 Claims, 7 Drawing Sheets

AUTOMATED CARRIER

BACKGROUND OF THE INVENTION

The present invention relates to a carrier, and more particularly to an automated carrier.

Figure 1:
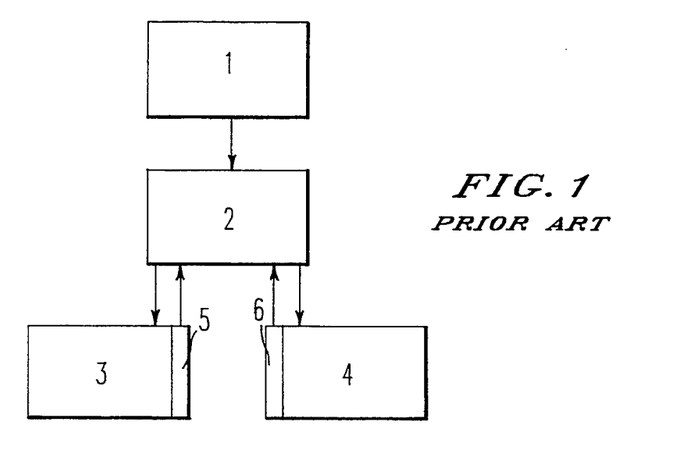
FIG. 1 is a block diagram showing an automated wheelchair according to the prior art.

The conventional automated carrier, e.g. an automated wheelchair, as shown in FIG. 1, includes a joystick 1 capable of causing speed and direction control signals to be sent to a motor controller 2 capable of respectively sending driving currents to left and right motors 3,4 respectively having two encoders 5,6 capable of sending speed feedback signals to controller 2. Such wheelchair undoubtedly bestows a great convenience on its user. Recently, some countries have developed a wheelchair which replaces the joystick with a phonetic controller so that a user having no or inoperative hands can control the wheelchair merely by means of phonetic voices. Nevertheless, such wheelchairs have the following disadvantages:

1) The conventional automated wheelchair can only be controlled by a joystick or a phonetic control system so that a user cannot select the desired controlling manner in a particular situation.
2) Since a wheelchair with a phonetic control system is often used by a user having no or inoperative hands, such wheelchair should be designed so as to assure a greater safety for the user. Nevertheless, no such wheelchair is so designed up to now.
3) A wheelchair user normally requires a good protecting measure so that the wheelchair has a smoothly reduced speed upon approaching an obstacle. No conventional wheelchair, however, has such a protecting measure.

It is therefore an object of the present invention to eliminate the above shortcomings.

SUMMARY OF THE INVENTION

It is therefore an object of the present invention to provide a protecting automated carrier.

It is further an object of the present invention to provide a diversified automated carrier.

It is an additional object of the present invention to provide an automated carrier having a greater practicing flexibility.

According to the present invention, an automated carrier includes a carrying body mounting thereon a driving means electrically connected to a controller electrically connected to a commanding means for controlling the moving speed and direction of the carrying body, a CPU electrically connected between the controller and the commanding means, and a protecting means electrically connected to the CPU and capable of resulting in a desired response when the carrying body is within a predetermined distance from an obstacle.

Certainly, the driving means can include the known motors and encoders. The carrier can be a standard wheelchair or one having 3 or 4 wheels. The commanding means can be a joystick or a phonetic recognition device having a signal-inputting medium, for example, a phonetic microphone or one capable of sensing a blowing strength or a throat vibration of a user of the carrier.

The protecting means may be a known infrared detector capable of emitting therefrom a warning signal to remind the user when the carrying body is within a predetermined distance away from an object. Alternatively, the protecting means may preferably be a supersonic detector capable of sending a detected result to the CPU for sending speed control signals to the controller and thus enabling the carrying body to smoothly slow down the speed thereof.

Certainly, the CPU can be a microcomputer capable of being so programmed that the carrying body is immovable when the microcomputer is hanged up. The controller can be a servo driver.

The present invention may best be understood through the following description with reference to the accompanying drawings, in which:

DETAILED DESCRIPTION OF THE PREFERRED EMBODIMENT

Figure 2:
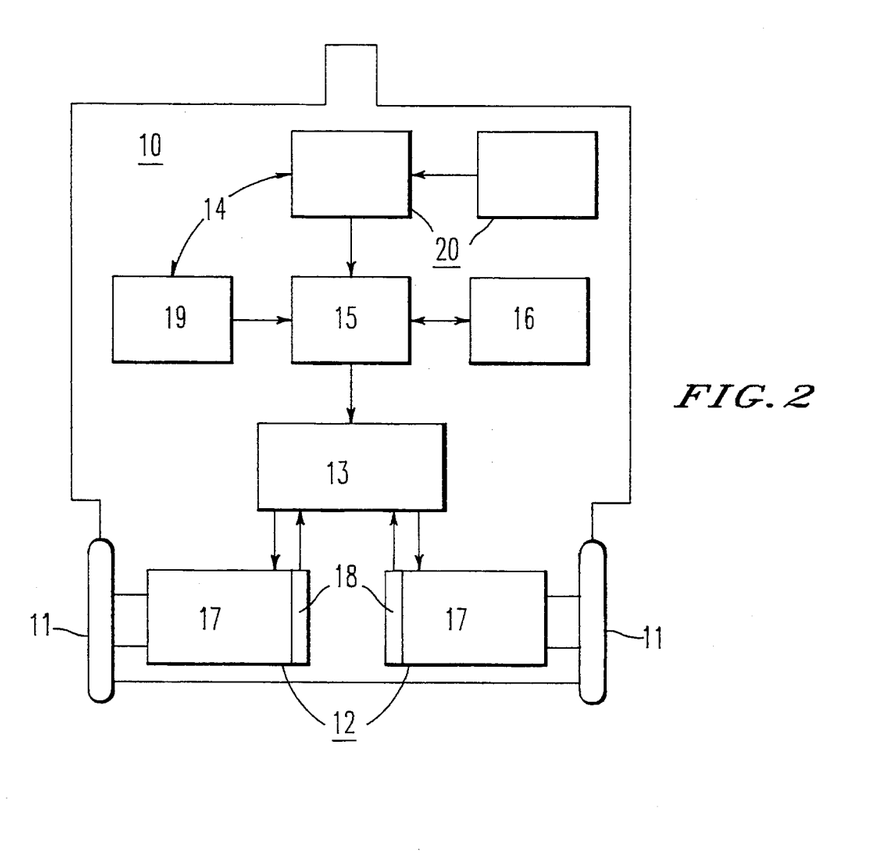
FIG. 2 is a schematical block diagram showing a preferred embodiment of an automated wheelchair according to the present invention.
Figure 3:
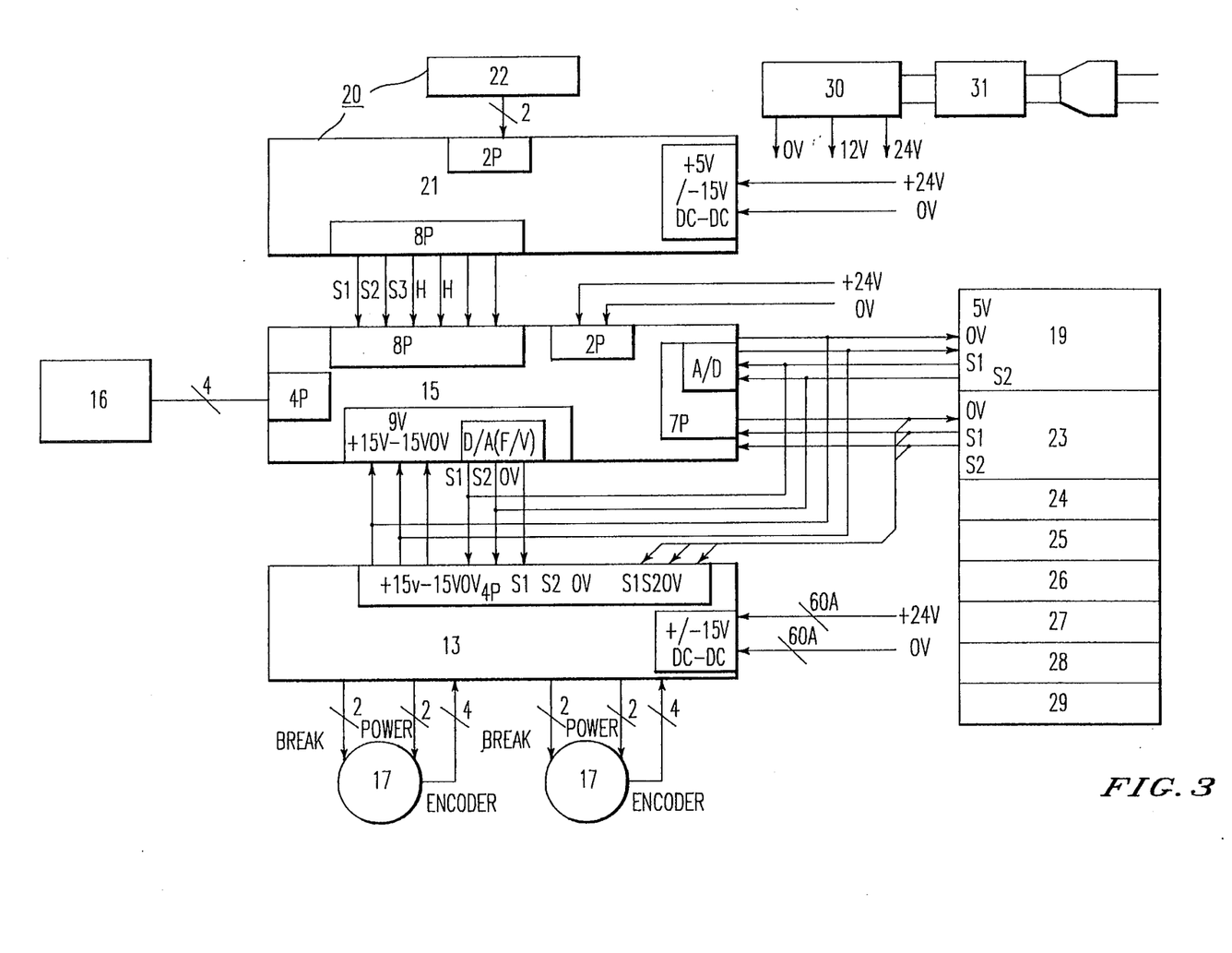
FIG. 3 is a schematical circuit diagram of an automated wheelchair in FIG. 2.

Referring now to FIGS. 2 & 3, the automated wheelchair according to the present invention includes a carrying body 10 having moving wheels 11, a driving means 12 mounted on body 10 for driving wheels 11, a controller 13 (e.g. a servo driver) electrically connected to driving means 12, a commanding means 14 electrically connected to controller 13 for controlling the speed and direction of body 10, a CPU 15 electrically connected between controller 13 and commanding means 14, and a protecting means 16 electrically connected to CPU 15 and capable of resulting in a desired response when body 10 is within a predetermined distance from an obstacle. Driving means 12 can be two known motors 17 respectively electrically connecting thereto two known encoders 18 for respectively sending speed feedback signals to controller 13. Body 10 can be a wheelchair or a desired one (e.g. a reclining chair) having 3 or 4 wheels.

Commanding means 14 can be a joystick 19 and/or a phonetic recognition device 20. Joystick 19 can send by means of a known manner a speed (/direction) control signal to CPU 15 which may be a microcomputer, e.g. an Intel 8031 IC, by which the present carrier can be multifunctional and can have a practicing flexibility. For example, microcomputer 15 can be so programmed that body 10 will only run at a relatively low speed when phonetically controlled. As a further example, microcomputer 15 can be so programmed that motors 17 are undrivable when microcomputer 15 is hanged up. Phonetic recognition device 20 can include a phonetic recognizer 21, e.g. a TMS320C25FNL IC manufactured by TI, and a signal-inputting medium 22 capable of being a phonetic microphone or a known diaphragm capable of sensing the blowing strength (or the throat vibration mode of) of the user of the present carrier.

Protecting means 16 can be a known infrared detector capable of emitting a warning signal to remind the user when body 10 is within a predetermined distance from an obstacle. Preferably means 16 is a supersonic detector capable of sending a detected result to CPU 15 for sending a speed control signal to controller 13. CPU 15 can be so programmed that controller 13 will smoothly (and halfly) slow down the speed of body 10 when supersonic detector 16 detects that there exists an obstacle, and will smoothly recover to its original running speed when the obstacle moves away or body 10 gets away from the obstacle.

Body 10 can additionally include a speed-changing knob 23 electrically connected to microcomputer 15, a power meter 24, a supersonic switch 25, a power switch 26, a headlight switch 27, a blinker switch 28, a horn switch 29, two serially connected 12 V batteries 30 and an electrifying medium 31.

Microcomputer 15 receives through inputting interfaces signals coming from phonetic recognition device 20, joystick 19, speed-changing knob 23 and the detecting head of supersonic detector 16 to be processed by the governing software thereof for sending therefrom the motor control signal to servo driver 13.

In view of the aforesaid, one skilled in the art will be able to practice the present invention. Since a further detailed explanation for the present invention is not deemed necessary, a brief description hereinafter is provided for interest about some working principles and routine flowcharts for the present invention.

The present invention adopts the following techniques, i.e. the microcomputer application, A/D (analog-to-digital), F/V(frequency-to-voltage) and supersonic transmitting/receiving techniques. The microcomputer application technique includes: 1) controlling the running of body 10 according to the phonetic command sent from phonetic recognition device 20; 2) controlling the running of body 10 according to the digital code converted from the joystick voltage; 3) determining whether there exists an obstacle according to the distance moved from the time interval between the supersonic transmission and reception; and 4) calculating the running speed of body 10 and programming 8254 ICs (Timer/Counters) to generate the pulse frequency required by the F/V circuit.

The A/D technique converts by means of an ADC 0809 A/D converter the joystick voltage into the digital code by which 8031 CPU 15 can determine the running direction and speed of body 10. Specifically, 8031 CPU 15 will regard the digital code of the ADC 0809 converter as the address for checking the speed data table having 128 data respectively corresponding to 128 shares of the input frequency range of the F/V circuit, and will take from said address the speed data to be sent to the 8254 IC thus capable of counting the frequency value required by the F/V circuit.

The F/V technique converts the frequency of the speed pulse calculated by 8031 CPU 15 into the voltage to be sent to driver 13 for driving motors 17.

The supersonic transmitting/receiving technique detects whether there exists an obstacle when body 10 is running, based on the fact that the supersonic wave will reflect upon encountering an obstacle so that the distance between body 10 and the obstacle can be calculated according to the time interval between the supersonic transmission and reception.

Figure 4:
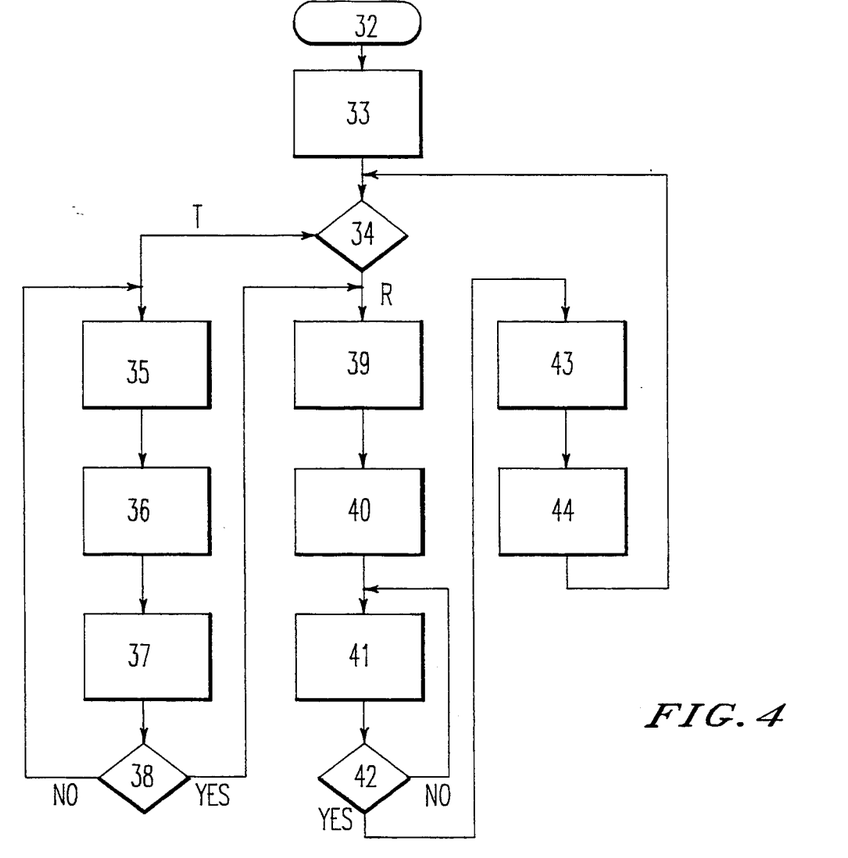
FIG. 4 is a phonetic teaching and recognition flowchart for an automated wheelchair in FIG. 2.

As shown in FIG. 4, the software flowchart of phonetic recognition device 20 can be start 32, measuring the background noise 33, ascertaining whether teaching or recognizing procedure is desired 34; upon teaching, detecting the phonetic beginning and ending 35, operating the DSP(digital signal processor)-CPU to obtain characteristic parameters 36, storing parameters into the RAM 37 and determining whether the teaching procedure is finished 38; if not, continuing steps 35–38 and if yes, transferring to the recognizing procedure; upon recognizing, detecting the phonetic beginning and ending 39, operating the DSP-CPU to obtain the characteristic parameter 40, sequentially comparing the characteristic parameter (in Step 40) with the parameters stored in the RAM 41, determining whether the sequential comparisons are completed 42; if not, continuing steps 41 & 42 and if yes, finding out the one bearing the smallest difference from the characteristic parameter (in Step 40) 43, and finally displaying the recognized result 44.

Figure 5:
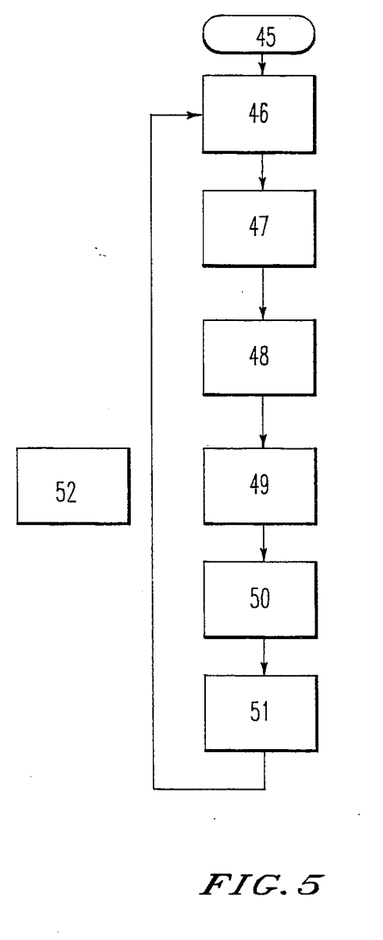
FIG. 5 is a main routine flowchart for the automated wheelchair shown in FIG. 2.

As shown in FIG. 5, the main routine flowchart for microcomputer 15 can be start 44, calling the initial value setting subroutine 46, calling the input subroutine 47, calling the direction judging subroutine 48, calling the phonetic code treating subroutine 49, calling the no supersonic reflection treating subroutine 50, and calling the acceleration and deceleration treating subroutine 51. The supersonic interrupting subroutine 52, however, is capable of interrupting any one of subroutines 46–51 at any time.

Figure 6:
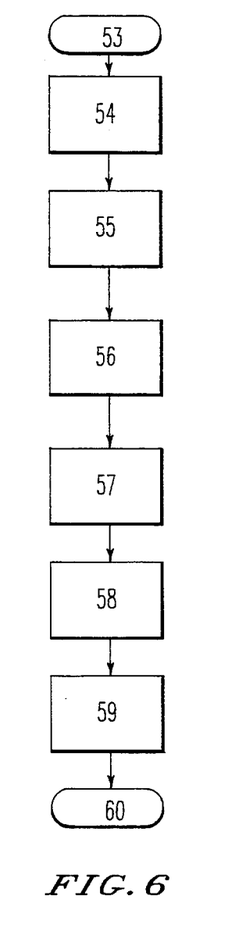
FIG. 6 ia an initial value-setting subroutine flowchart for the automated wheelchair shown in FIG. 2.

As shown in FIG. 6, the flowchart of initial value setting subroutine 46 can be start 53, permitting interruption 54, stopping wheels 11 from rotating 55, programming counting modes for 8254 ICs 56, clearing data buffer and setting initial values 57, setting controlling flags 58, permitting interruption 59 and end 60.

Figure 7:
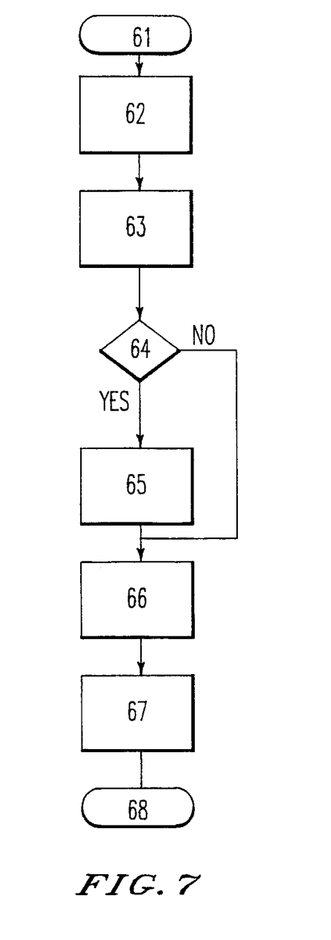
FIG. 7 is an input subroutine flowchart for the automated wheelchair shown in FIG. 2.

As shown in FIG. 7, the flowchart of input subroutine 47 can be start 61, reading the joystick value converted by the ADC0809 converter 62, comparing the present read value and the preceding read value 63, determining whether the difference between the two values is greater than 8 (64), if yes, renewing the joystick value 65 and if not, reading the set value of the speed-changing knob 66, setting the utmost speed value of body 10 (67) and end 68.

Figure 8:
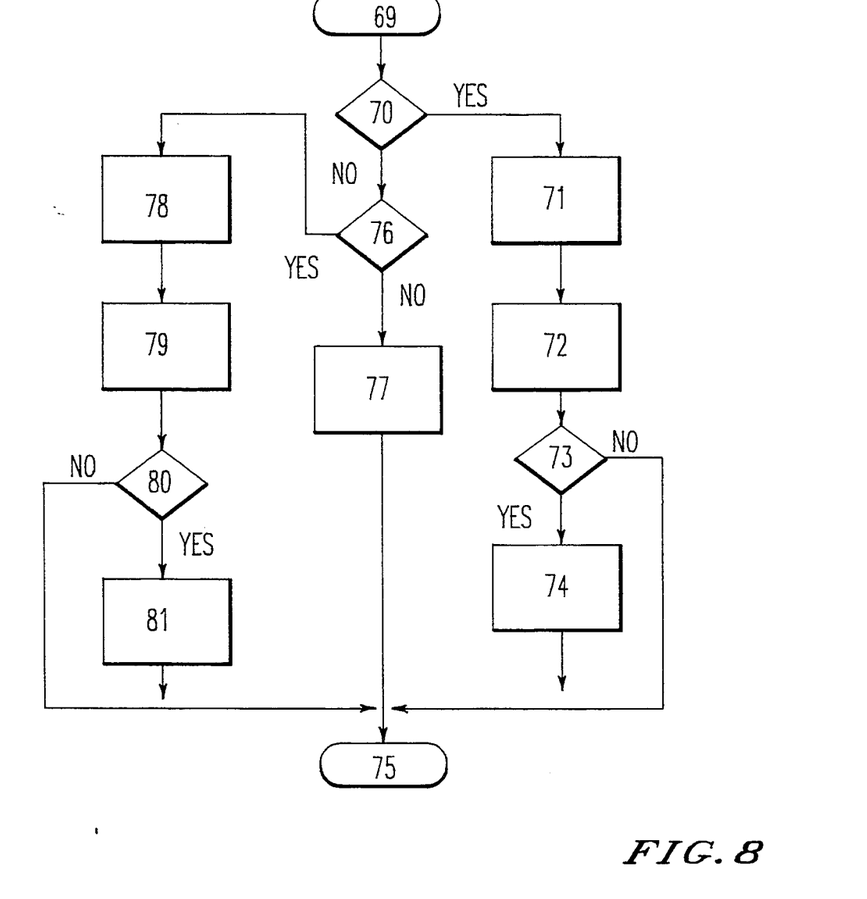
FIG. 8 is a direction-judging subroutine flowchart for the automated wheelchair shown in FIG. 2.

As shown in FIG. 8, the flowchart of direction-judging subroutine 48 can be start 69, determining whether the joystick value is greater than 8FH 70 wherein H represents the hexadecimal notation; if yes, reversely driving motors 17(71), calculating the target speed 72, determining whether there exists an obstacle 73; if yes, smoothly reducing the target speed to one half thereof 74 and end 75 and if not, going to end 75; if the joystick value is smaller than 8FH, determining whether it is smaller than 71H; if not, zeroingly setting the target speed 77 and end 75 and if yes, reversely driving motors 17 (78), calculating the target speed 79, judging whether there exists an obstacle 80; if yes, smoothly and halfly reducing the target speed 81 and end 75 and if not, going to end 75.

Figure 9:
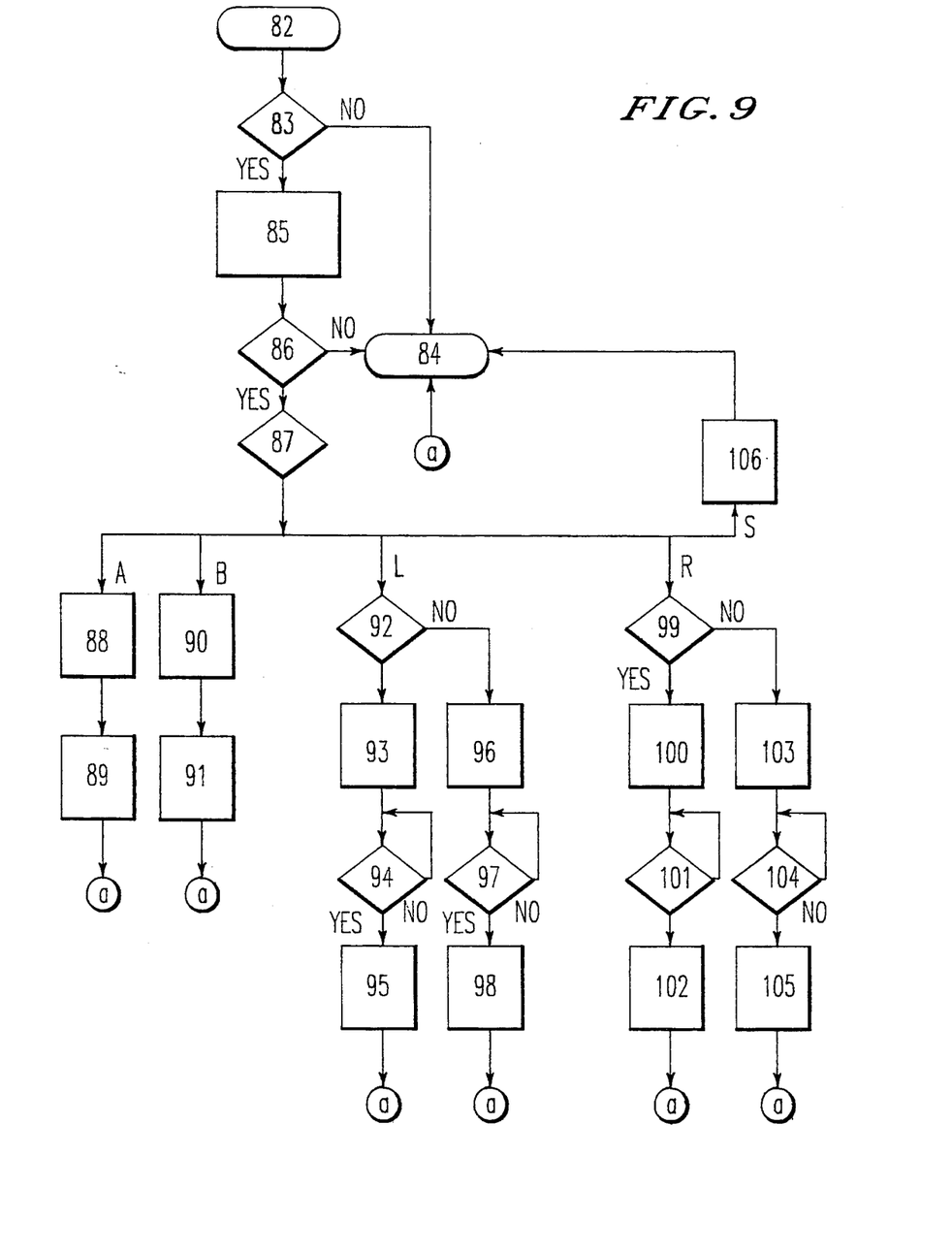
FIG. 9 is a phonetic code treating subroutine flowchart for the automated wheelchair shown in FIG. 2.

As shown in FIG. 9, the flowchart of phonetic code treating subroutine 49 can be start 82, determining whether there is any phonetic code sent from phonetic recognition device 20; if not, going to end 84 and if yes, reading the phonetic code 85, judging whether the phonetic command control is permitted 86; if not, going to end 84 and if yes, judging the phonetic code 87; if the phonetic code is to advance (A) body 10, regularly rotating wheels 11 (88), setting the running speed 89 and end 84, if to back (B) body 10, reversely rotating wheels 11 (90), setting the running speed 91 and end 84, if to leftwardly turn (L) body 10, judging whether the phonetic code is to forwardly leftwardly turn body 10 (92); if yes, speeding the right wheel 11 for a period of 2 seconds 93, judging whether the period of 2 seconds is up 94; if not, keeping on judging and if yes, restoring the right wheel 11 to its original speed 95 and end 84; if to backwardly leftwardly turn body 10, speeding the left wheel 11 for a period of 2 seconds 96, judging whether the period of 2 seconds is up 97; if not, keeping on judging and if yes, restoring the left wheel 11 to its original speed 98 and end 84; if to rightwardly turn (R) body 10, judging whether the phonetic code is to forwardly rightwardly turn body 10 (99); if yes, speeding the left wheel 11 for a period of 2 seconds 100, judging whether the period of 2 seconds is up 101; if not, keeping on judging and if yes, restoring the left wheel 11 to its original speed 102 and end 84; if to backwardly rightwardly turn body 10, speeding the right wheel 11 for a period of 2 seconds 103, judging whether the period of 2 seconds is up 104; if not, keeping on judging and if yes, restoring the right wheel 11 to its original speed 105 and end 84; and if to stop (S) body 10, stopping wheels 11 (106) and end 84.

Figure 10:
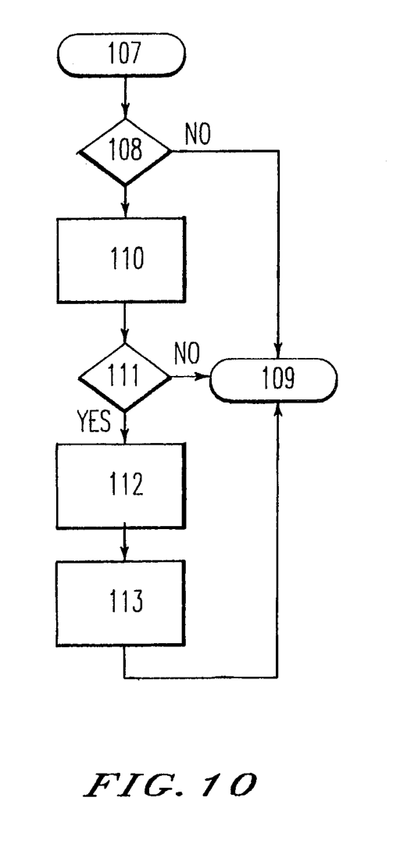
FIG. 10 is a no supersonic reflective wave-treating subroutine flowchart for the automated wheelchair shown in FIG. 2.

As shown in FIG. 10, the flowchart of no supersonic reflection treating subroutine 50 can be start 107, judging whether there exists an obstacle 108; if not, going to end 109 and if yes, deducting the no supersonic reflection counter value by 1 (100); judging whether the counter value is zero 111, if not, going to end 109 and if yes, clearing the obstacle flag 112, setting the 8254 counter value representing there exists an obstacle 113 and end 109.

Figure 11:
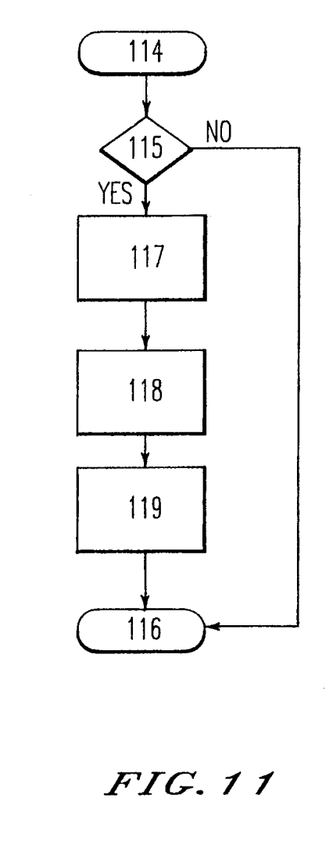
FIG. 11 is an acceleration and deceleration-treating subroutine flowchart for the automated wheelchair shown in FIG. 2.

As shown in FIG. 11, the flowchart of acceleration and deceleration treating subroutine 51 can be start 114, judging whether the present speed value differs from the target speed value 115; if not, going to end 116 and if yes, changing the present speed value to the target speed value 117, checking the speed data table to find out the counting value of the 8251 counter 118, setting the counting value of the 8254 counter 119 and end 116.

Figure 12:
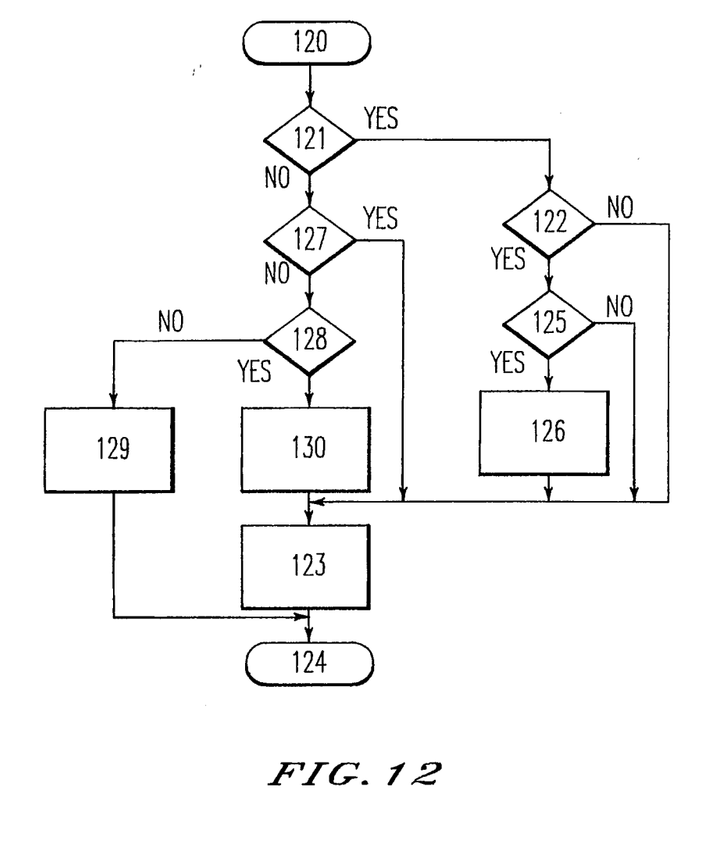
FIG. 12 is a supersonic interrupting subroutine flowchart for the automated wheelchair shown in FIG. 2.

As shown in FIG. 12, the flowchart of the supersonic interruption subroutine 52 can be start 120, judging whether the 8254 IC has finished its counting 121; if yes (representing there does not exist an obstacle), judging whether a flag denoting that there exists an obstacle has been set 122; if not, setting the counting value of the 8254 IC which represents there does not exist an obstacle 123 and end 124 and if yes, judging whether the 8254 IC has continuously by 5 times finished its counting 125; if not, setting the counting value of the 8254 IC which value represents there does not exist an obstacle 123 and end 124; if the 8254 IC has not finished its counting (representing there does not exist an obstacle), judging whether a flag denoting that there exists an obstacle has been set 127; if yes, setting the counting value of the 8254 IC which represents that there does not exist an obstacle 123 and end 124 and if not, judging whether the 8254 IC has continuously by two times not finished its counting 128; if not, setting the counting value of the 8254 IC which value represents that there exists an obstacle 129 and end 124 and if yes, setting the flag denoting that there exists an obstacle 130, setting the counting value of the 8254 IC which value represents that there does not exist an obstacle 123 and end 124.

In view of the foregoing description, the present invention should be readily apparent to one skilled in the art who is thus able to exercise his skill to make various modifications and kinds of changes thereto without departing from the spirit of the appended claims which scope is to be broadly interpreted.

What we claim is:

1. An automated carrier comprising:
   a carrying body;
   two motors mounted on said carrying body for driving said carrying body;
   a controller electrically connected to said two motors;
   two encoders respectively electrically connected to said motors for sending speed feedback signals to said controller;
   a manual commanding means electrically connected to said controller for controlling a moving speed and a moving direction of said carrying body;
   a microcomputer electrically connected between said controller and said manual commanding means and being so programmed that said carrying body is immovable when said microcomputer is hanged up;
   a phonetic recognition device electrically connected to said controller for controlling said moving speed and said moving direction of said carrying body and for allowing said controller to enable said carrying body to smoothly slow down an original speed thereon when said phonetic recognition device is actuated; and
   a protecting means electrically connected to said microcomputer and capable of resulting in a desired response when said body is within a predetermined distance from an obstacle, said protecting means being one of an infrared detector and a supersonic detector, said infrared detector being capable of emitting therefrom a warning signal when said body is within said distance from said obstacle and said supersonic detector being capable of sending a detected result to said microcomputer capable of sending first speed control signals to said controller for allowing said controller to enable said carrying body to smoothly slow down said original speed thereof.

2. A carrier according to claim 1, wherein said carrier is a wheelchair.

3. A carrier according to claim 1, wherein said carrying body has three wheels.

4. A carrier according to claim 1, wherein said carrying body has four wheels.

5. A carrier according to claim 1, wherein said manual commanding means is a joystick for sending second speed control signals and direction control signals to said microcomputer.

6. A carrier according to claim 1, wherein said original speed is halfly slowed down when said supersonic detector detects that there exists said obstacle.

7. A carrier according to claim 1, wherein said phonetic recognition device is a voice synthesizer capable of sending a recognized signal to said microcomputer capable of sending said first speed control signals to said controller.

8. A carrier according to claim 1, wherein said phonetic recognition device includes a signal inputting medium.

9. A carrier accordign to claim 8, wherein said signal inputting medium is capable of sensing a blowing strength of a user of said carrier.

10. A carrier according to claim 8 wherein said signal inputting medium is capable of sensing a throat vibration of a user of said carrier.

11. A carrier according to claim 8 wherein said signal inputting medium is a phonetic microphone.

12. A carrier according to claim 1, wherein said phonetic recognition device and said manual commanding means can be selectively actuated by a user of said carrier.

13. A carrier according to claim 1 wherein said controller is a servo driver.

* * * * *